Figure 1:
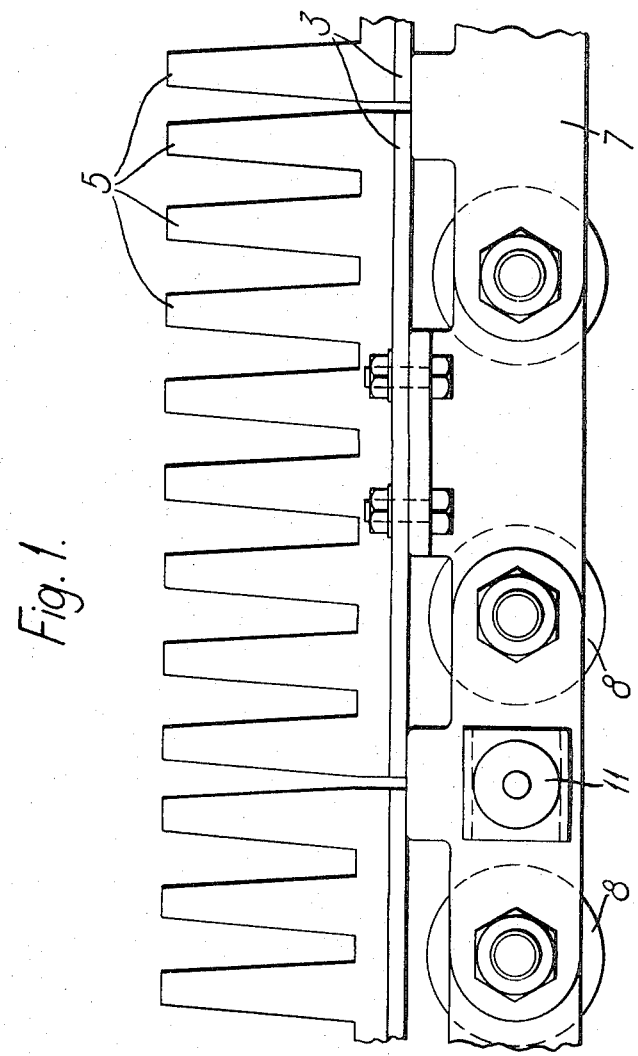

United States Patent [19]

Meeusen

[11] 3,857,478

[45] Dec. 31, 1974

[54] SYSTEM OF AND A METHOD FOR TRANSPORTING HEAVY OR BULKY ARTICLES

[75] Inventor: Pieter Meeusen, Barendrecht, Netherlands

[73] Assignee: H. Nielsen & Son Maskin-Fabrik A/S, Copenhagen, Denmark

[22] Filed: Feb. 1, 1973

[21] Appl. No.: 328,720

Related U.S. Application Data

[63] Continuation of Ser. No. 72,974, Sept. 17, 1970, abandoned.

[30] Foreign Application Priority Data

Sept. 17, 1969 Netherlands...................... 6914089

[52] U.S. Cl. ............................................... 198/195
[51] Int. Cl. ............................................ B65g 15/30
[58] Field of Search.................... 198/195, 165, 729

[56] References Cited
UNITED STATES PATENTS

| 874,915 | 12/1907 | Perry | 198/195 |
| 1,758,397 | 5/1930 | Harber | 198/195 |
| 2,150,984 | 3/1939 | Near | 198/165 |

*Primary Examiner*—Richard E. Aegerter
*Attorney, Agent, or Firm*—Cushman, Darby & Cushman

[57] ABSTRACT

An endless-chain conveyor system for transporting heavy or bulky articles, such as the containers in containerisation, the system incorporating one or more endless-chain conveyors comprising load-supporting members pivoted together to permit them to be carried round with the endless conveyor or conveyors, and rollers which run on rails and transmit the load to be conveyed to the rails. The rollers are preferably driven on the rails by tangential drive by the said members in being displaced by independent chain-drive means. The members may be provided with resilient pads, e.g., of toothed form, to yield to bottom corner fitments on the containers. The conveyors are advantageously arranged as a pluripartite system supporting the containers at least along opposite side regions thereof and each formed by a tandem plurality of separate endless-chain sections.

3 Claims, 7 Drawing Figures

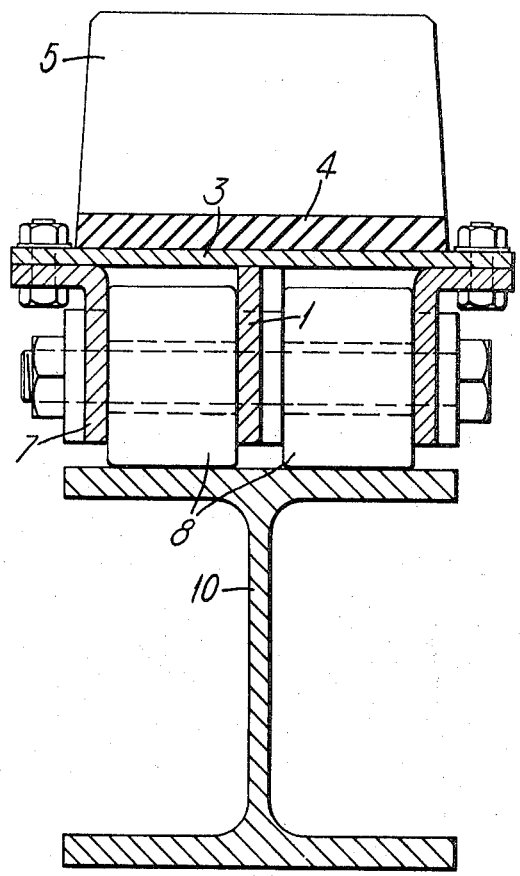
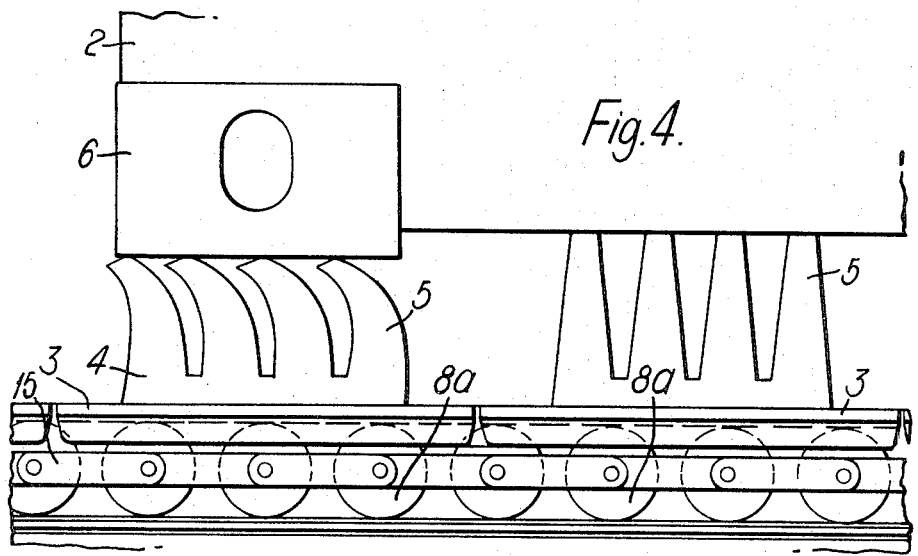

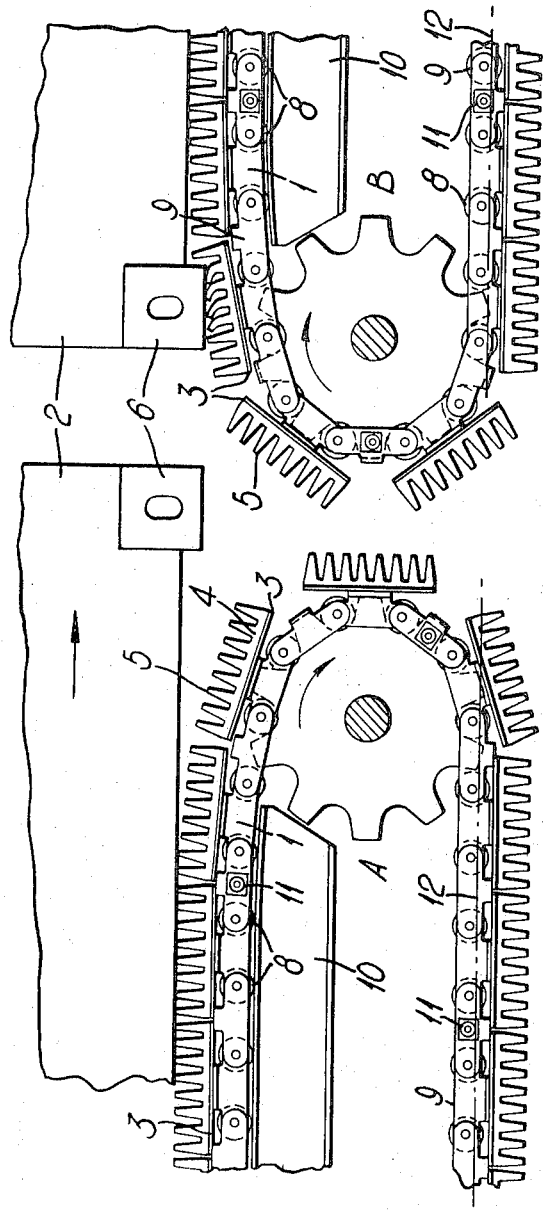

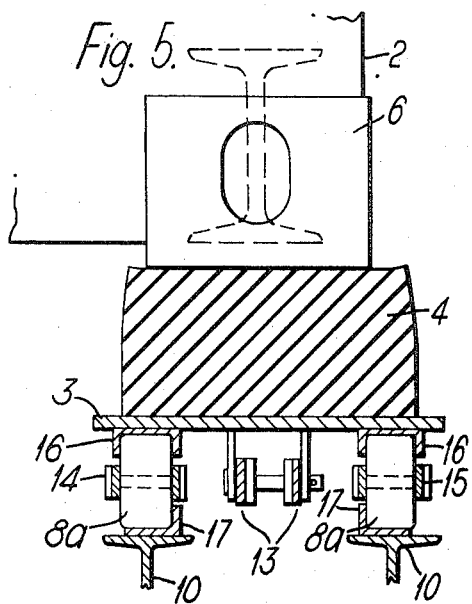
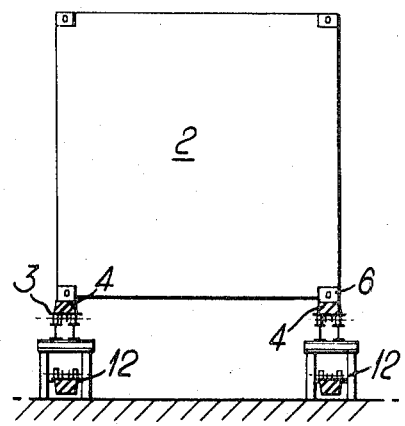
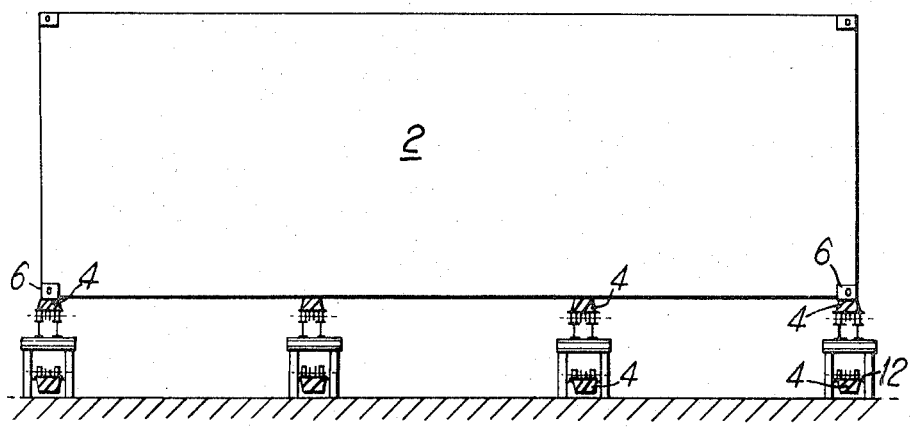

SYSTEM OF AND A METHOD FOR TRANSPORTING HEAVY OR BULKY ARTICLES

This application is a continuation of Ser. No. 72,974, Sept. 17, 1970.

This invention relates to conveyor systems for transporting heavy or bulky articles.

The present invention provides an endless-chain conveyor system for such articles, said system incorporating one or more endless-chain conveyors comprising, or each comprising, load-supporting members pivoted together to permit them to be carried round with the endless conveyor or conveyors, and rollers which run on rails and transmit the load to be conveyed to the rails.

The invention is more particularly, although not exclusively concerned, with transporting bulk containers such as are now employed on a large scale in the so-called containerisations, and it will be hereinafter described in this connection.

When loading large containers, frequently heavily loaded by the contents, such a conveyor system may be subjected to considerable shock and stress and to lessen the effect thereof on the conveyor system, it is preferred to provide the load-supporting members with resilient pads adapted to yield elastically under the load.

Modern bulk containers are frequently metal-framed with corner fitments in the form of castings, e.g., for lifting or lowering purposes, and these castings may project below the bottom of the container. In such a case the local pressures applied to the load-supporting members at these zones are extremely high. The resilient pads are therefore preferably made with upstanding teeth or projections which can be deflected under load. The teeth or projections may deflect strongly under the powerful corner pressure and yet provide a general support for the container.

The rails may be fixed parts of a strong frame, upper rails supporting the load through the uppers flights of the conveyors. The rollers in the lower (return) flights may also run on bottom rails, or additional rollers may be provided, when necessary, for this purpose.

The load-supporting members may provide bearings supporting the rollers but the load is then transmitted through these bearings and this may militate against the rolling action of the conveyors on the rails and the smooth operation of the system. It is therefore preferred to connect the load-supporting members to one or more sprocket-driven chains for drive and to provide the load-transmitting rollers on separate endless chains which are driven in rolling contact with the rails by the tangential force applied thereto by the load-supporting members when these are displaced by the driving chain or chains.

There may be two or more conveyors arranged to be bridged by the containers and forming a bipartite or multipartite transporter, these conveyors operating synchronously to displace the containers as an aligned series and each being fitted with load-supporting members and load-transmitting rollers, the conveyors being arranged to support the containers at least along each of their longitudinal sides but preferably only locally in relation to the width of the transporter and of the containers. Each said conveyor may be composed of two or more endless sections arranged in tandem order in the direction of transportation and fitted with load-supporting members and load-transmitting rollers so that the containers, while being transported, pass from one transverse pair or plurality of synchronised endless sections to another in conveyance along the transporter. Each pair or plurality of synchronised sections may be independently driven and controlled. The separate endless chains carrying the rollers may likewise be composed of sections in tandem order.

The invention also includes the method of transporting heavy or bulky articles, such as bulk containers, which comprises feeding the articles onto load-supporting members pivoted to endless chain transporting means incorporating rollers which transmit the load to load-accepting rails. One or more endless chains may be sprocket-driven and the said members when displaced by the drive of the chain or chains caused to apply tengential pressure to rollers carried by further endless chains to drive these in rolling contact with the load-accepting rails.

The method may be applied advantageously to the transport of articles in the form of containers with bottom corner fitments as aforesaid which project below the base of the container, the conveyors being arranged in such spaced relation that the bottom corner fitments are all supported by the load-supporting members, the conveyors and their load-supporting members being of a width not substantially greater than the transverse dimension of the corner fitments. The support members are then preferably provided with resilient pads of toothed form as previously described, to deflect or deflect more strongly where subjected to the pressure of the corner fitments.

Where the containers are transported substantially in the direction of their length (which is normally longer than their breadth), two conveyors supporting the containers along their opposite sides will generrlly suffice, but the containers may be supported with their lengths extending across the conveyors, in which case three or more conveyors may be desirable, to give adequate medial support to the containers.

In order that the invention may be the more clearly understood, reference is made to the embodiments illustrated by way of example in the accompanying drawings, of which FIG. 1 is a side elevation, FIG. 2 is a cross-sectional elevation and FIG. 3 an enlarged side view showing one conveyor of a bipartite or multipartite transporter.

FIG. 4 is a side elevation showing the upper flight of a modifed form of conveyor, FIG. 5 is a cross-sectional elevation thereof and FIG. 6 is a diagrammatic end elevation on a smaller scale showing a container located on a bipartite transporter, i.e., one incorporating two such conveyors.

FIG. 7 diagrammatically shows a multipartite transporter, in this case one comprising four conveyors for transporting containers arranged cross-wise of the transporter.

Referring to FIGS. 1 to 3, endless conveyor chains 1 are depicted, FIG. 3 showing two endless conveyor sections A,B of one conveyor in tandem in the direction of transportation. Any suitable number of separate endless chain conveyor sections may be aligned in tandem order along each side of the transporter to support containers 2 for transport in the lengthwise direction thereof, each container passing from one pair of synchronised transversely abreast endless chain sections, say A (supporting it along its opposite sides) to another, say B, in transport.

Load-supporting members 3 are connected to the endless chains in pivoted relation to one another, and each such member is provided with a resilient, e.g., rubber, pad 4 which is formed with teeth or projections 5 on which the articles rest. Modern containers usually incorporate a metallic frame and corner fitments in the form of castings 6. These castings project below the base of the container, e.g., by approximately 1½. When the containers are loaded on the conveyor system, these corner castings apply heavy pressure on the pads and deflect the teeth or projections 5 as indicated in FIG. 3. The bottom of the container is however supported also by the remaining teeth and a more or less uniform support is provided for the container along each side thereof. The load-support members 3 form bearings 7 for rollers 8 the axles or trunnions of which pass through and connect the links 9 of the conveyor chains 1. These rollers, in the upper flights of the endless chains run on rails 10 and the chain links also support further smaller rollers 11 which in the lower flights of the chains run on bottom rails 12. The container load if thus transmitted through the resilient pads, 4, 5, and the support members 3 through the rollers 8 to rails 10.

It is to be noted that in this embodiment the load is transmitted through the bearings 7 for the rollers provided by the support members 2.

In the modified embodiment shown in FIGS. 4 to 6, in which the same parts as are employed in the embodiment illustrated in FIGS. 1 to 3 are given the same reference numerals, the support members 3, carrying the resilient toothed pads 4, are connected, in pivoted relation to one another, to a drive chain 13 which cooperates with sprocket wheels (not shown), but the load-transmitting rollers 8a are pivotally connected to separate endless chains 14 and 15 which are not positively driven by sprockets. These rollers 8a, which transmit the load to the rails 10, are driven in rolling contact with the rails by tangential force applied thereto by the members 3 when these are displaced by the driving chain 13. The support members 3 may have channel members 16 (which could be of a friction material) to drive the rollers. The rollers may be laterally restrained by members 17 secured to the rails. Thus the transmission of the load through bearings on the support members, as is the case in the embodiment shown in FIGS. 1 to 3, is avoided, and the distance travelled by the support members in the transporting direction is substantially double that of the travel of the roller axes in the same direction.

The embodiment shown in FIG. 7 shows that more than two conveyors 1 may be provided if the containers 2 are loaded crosswise.

The resilient pads aforesaid serve also to prevent the chain sprockets from being overloaded when a container is moved on the rails from one conveyor chain or pair or set of chains to another.

FIGS. 6 and 7 show two forms of the transporter from end aspect, incorporating in the case of FIG. 6, two conveyors which are bridged by the containers and which together form a bipartite transporter, which supports the containers only along their longitudinal side regions. The conveyors are in FIGS. 6 and 7 constructed as described and illustrated with reference to FIGS. 4 and 5, but the conveyors described and illustrated in FIGS. 1 to 3 may similarly be arranged to form a bipartite or multipartite transporter. Moreover the conveyors shown in FIGS. 4 and 5 may be made of endless sections in tandem as described with reference to FIGS. 1 to 3 (and more particularly shown in FIG. 3).

Sensor means may be provided whereby signals may be sent to the loading station or stations, e.g., in dependence upon the stock of articles at the delivery station so that the feed rate of the transporting means or sections thereof may be controlled.

What is claimed is:

1. An endless chain system for transporting bulk containers, said system comprising endless chain conveyor means and sprocket means therefor; means for driving said sprocket means; load-supporting members connected in said chain conveyor means to permit them to be carried round with said conveyor means and to pivot in relation to one another in passing round said sprocket means, said chain conveyor means and said load-supporting members forming a transporting unit, rollers rotatably supported by said unit and, transportable therewith, and, rails upon which said rollers run during transportation; said load-supporting members being directly supported at each side thereof by said rollers on said rails and having resilient load-supporting toothed pads, each pad having a plurality of teeth which project upwardly with respect to said rails and which are deflectable in a direction parallel to said rails and yield elastically to the container supported thereby.

2. An endless chain system according to claim 1 for transporting bulk containers with downwardly projecting corner projections, in which said load-supporting members have resilient surfaces which yield elastically to said corner projections and uniformly support the bottom of the container.

3. An endless chain system according to claim 1 comprising spaced chain conveyors with said load-supporting members bridging the said conveyors transversely, at least two of said conveyors being arranged in close tandem at each side.

* * * * *